(No Model.)
E. GUTMANN.
SUSPENDER END.
No. 501,272. Patented July 11, 1893.
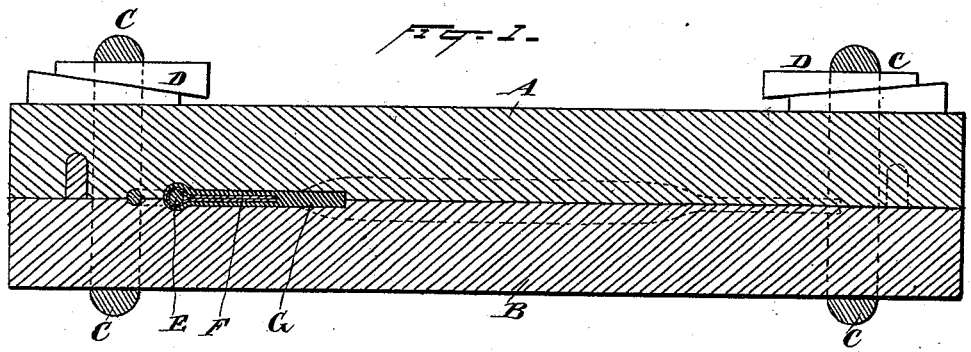
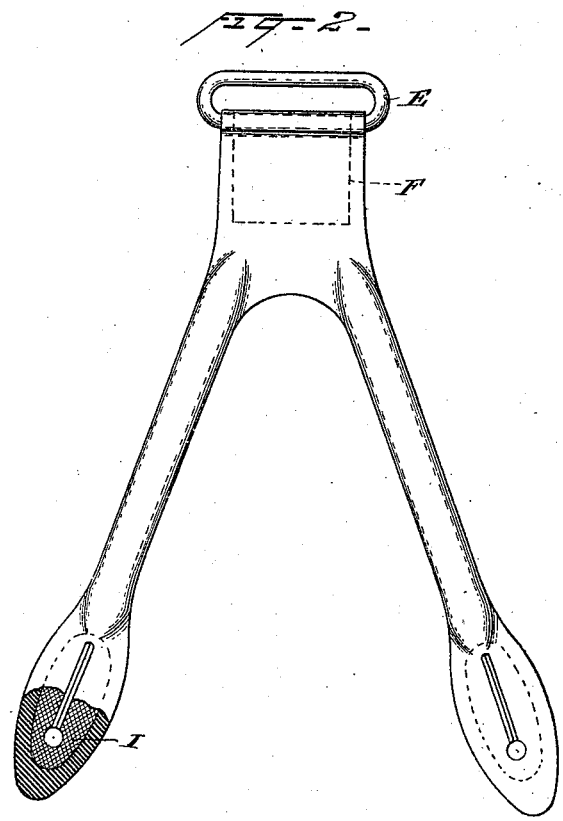
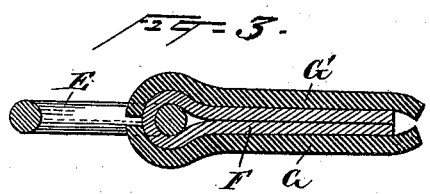
WITNESSES.
Norris A. Clark.
Charles R. Searle.
INVENTOR.
Emil Gutmann
by his attorney
Thomas Drew Stetson

UNITED STATES PATENT OFFICE.

EMIL GUTMANN, OF NEW YORK, N. Y.

SUSPENDER-END.

SPECIFICATION forming part of Letters Patent No. 501,272, dated July 11, 1893.

Application filed October 3, 1892. Serial No. 447,591. (No model.)

*To all whom it may concern:*

Be it known that I, EMIL GUTMANN, a citizen of the United States, residing in the city and county of New York, in the State of New York, have invented a certain new and useful Improvement in the Construction of Suspender-Ends, of which the following is a specification.

Many efforts have been made to impart a sufficient elastic yielding quality to suspenders by the employment of ends having soft vulcanized rubber variously combined. This invention is based on that general idea. I combine with such rubber end a rectangular or other form of loop of metal, causing it to be embraced by the rubber at the upper extremity of the suspender end, and to be vulcanized in place. The rubber serves well for the main body of the end, and the metal loop as applied forms a convenient and durable means of attachment to the other portion of the suspender. In what I esteem the most complete development of the invention, the buttonholes and the upper extremity, that which attaches to the metal loop is fortified with fabric.

The accompanying drawings form a part of this specification and represent what I consider the best means of carrying out the invention.

Figure 1 is a cross section through the mold with the suspender end in place therein. Fig. 2 is a face view of the finished article. Fig. 3 is a central longitudinal section through the metallic link, the piece of canvas embracing the same, and a layer of vulcanized rubber above and below ready for placing in the mold.

Similar letters of reference indicate corresponding parts in all the figures where they appear.

I provide a mold in two parts, A B, with provisions as the encircling frame C and wedges D, for strongly holding them together to effect the vulcanizing of the material inclosed. The cavity for the suspender end is produced on the inner faces and may be sunk about equally in each part of the mold.

E is an oblong link of steel wire or analogous material, having the ends abutting together in a straight side as shown. I form on the inner faces of the mold, at what is to be the upper extremity of the suspender end, a suitably shaped recess,—it may be half in each part, adapted to receive and hold this metal loop correctly placed.

F is a piece of strong canvas, saturated with rubber folded and applied in the position shown in Fig. 3, extending through the link E, and with each end in the cavity of the mold which is to shape the rubber portion.

The gum, kneaded with the proper quantity of sulphur for the production of soft vulcanized rubber, having been previously manufactured into sheets, is cut by dies or otherwise, into shapes of proper thickness, and introduced in the mold in two layers. First a piece G of the unvulcanized material is applied in the mold A to form the bottom layer. Then the canvas F and the metallic link E are laid in the recess provided therefor, with the free ends of the canvas F extending inward upon the unvulcanized rubber, and the small pieces I of the fabric to fortify the button holes are applied; then another piece G' of the unvulcanized material is applied to form the second layer. It will facilitate the holding if the surfaces which apply together are made tacky with rubber cement or otherwise. Next the upper part B of the mold is brought into position and compressed tightly upon the part A and the inclosed material by applying the frames C and wedges D, and the whole is exposed to the proper temperature for the required period to effect the vulcanizing.

The button holes formed in the ends to apply on the buttons of the pantaloons, should be fortified by corresponding pieces of canvas, or they may be thinner woven material as muslin, applied at the proper points where the button holes are to be produced. On opening the mold after removal and cooling, the suspender-end may, if necessary, be sheared at the edges by hand or by dies, and it is ready for use. It may be attached to an elastic or inelastic web, by passing the end of the web through the loop E and securing the end either immovably or adjustably, as by a Guyot-slide. The button-holes are completed after the removal of the goods from the mold, this being effected by punching or otherwise cutting through both the rubber and the muslin at the required points.

I claim as my invention—

A suspender end of soft vulcanized rubber having the fabric F inclosed at the upper end and the fabric I inclosed at the lower end, leaving the mid-length freely elastic, in combination with the link E, attached by vulcanizing in place, all adapted for joint service substantially as herein specified.

In testimony that I claim the invention above set forth I affix my signature in presence of two witnesses.

EMIL GUTMANN.

Witnesses:
CHARLES R. SEARLE,
M. F. BOYLE.